United States Patent [19]
Taylor

[11] 3,980,471
[45] Sept. 14, 1976

[54] PROCESS FOR CLASS III-B METALS ORE REDUCTION

[76] Inventor: Paul Franklin Taylor, P.O. Box 468, Crossville, Tenn. 38555

[22] Filed: June 17, 1974

[21] Appl. No.: 479,882

[52] U.S. Cl. .............................. 75/84.1 R; 75/84.4; 252/301.1 S; 252/301.1 W; 423/19; 423/256
[51] Int. Cl.² .................... C22C 61/02; C22C 61/00
[58] Field of Search .............. 252/301.1 S, 301.1 W; 423/19, 256; 75/84.4, 84.1 R

[56] References Cited
UNITED STATES PATENTS

| | | | |
|---|---|---|---|
| 1,434,485 | 11/1922 | D'Adrian | 423/19 |
| 1,434,486 | 11/1922 | D'Adrian | 423/19 |
| 1,918,884 | 7/1933 | Zellmann | 252/301.1 |
| 3,006,859 | 10/1961 | Allenmann et al. | 252/301.1 W |
| 3,008,904 | 11/1961 | Johnson, Jr. et al. | 252/301.1 W |

*Primary Examiner*—Brooks H. Hunt

[57] ABSTRACT

Class III-B metal ores such as Thorium and Uranium oxides are reduced to the powdered metal state by mixing them with a hydroxide such as Sodium Hydroxide (NaOH), or others of the Classes I-A and II-A metal series, and sugar or starch, then heating the mixture until hydrocarbon fuel is produced and burns utilizing the oxygen of the ores for such combustion, then boiling the residue in water, flushing and rinsing it in same, further cleansing in hydrocarbon or alcohol solutions, again flushing and rinsing in water, drying, and screening the residue to metal powder.

7 Claims, No Drawings

PROCESS FOR CLASS III-B METALS ORE REDUCTION

It is known that such oxides are reduced to the metal by converting them first to the fluoride by hydrofluoric acid then heating the halide with metallic calcium in a steel bomb lined with calcium oxide to prevent the charge from reacting with the metal walls.

In instant process the oxides are reduced by mixing them with a hydroxide of the Classes I-A and II-A series of elements and either sugar or starch, heating the mixture in either open (atmospheric) or closed (vacuum-inert-outgassing) containers sufficient to form a hydrocarbon fuel, which then burns utilizing the oxygen of the ores, and by so doing reducing the ores; such residue then being boiled and flushed in water, further cleansed in hydrocarbon, alcohol, acids, or other such leaching and cleansing agents, then again rinsed with water, dryed, and screened to the metal powder.

Therefore, the instant process relates to an improved method of separating the Class III-B series of metals from chemically combined oxygen and other impurities; more specifically termed reduction of the oxides and ores in which the metals exist as parts; such separations herein known as CLASS III-B METALS ORE REDUCTION.

As starting materials for this process finely pulverized Class III-B metal oxides are provided from the native ores; such ores being Monazite, Carnotite and Uranite, or Pitchblende. The sugar and starch are of the chemical varieties as Sucrose $(C_{12}H_{22}O_{11})$, Glucose $(C_6H_{12}O_6)$, Fructose $(C_6H_{12}O_6)$, and starch $(C_6H_{10}O_5)$. The base hydroxides are of the types as derived from the Classes I-A and II-A series of elements, the most important being sodium hydroxide, potassium hydroxide and calcium hydroxide (NaOH, KOH, and $Ca(OH)_2$).

When the selected ore and other starting materials are mixed well and heated within an appropriate reduction container with endothermic heat a chemical reaction results among the materials so as to produce a hydrocarbon fuel which then burns by extracting the oxygen from the ores and other reduction materials, and by such exothermic action the consequent reduction of the ores.

It is, therefore, an object of the instant invention to provide another method for the reduction of Class III-B metal ores by the main feature of heating the mixed component materials to produce hydrocarbon fuel which then burns by extracting the oxygen from the ores.

It is another object of the instant invention to provide a much simpler and more economical manner for the reduction of such ores than that provided in other known reduction processes by the advantage of producing hydrocarbon fuel within the reduction medium by heating (endothermic), then burning the fuel with the oxygen as extracted from the ores (exothermic); such reductions being accomplished within either atmospheric or vacuum-inert-outgassing controlled furnace environments.

Other objects and advantages of the instant invention improvements will become apparent from a further reading of the description and the appended claims.

With the above and other objects in view; the present invention mainly comprises in another process for separating the Class III-B metals from the chemically combined element oxygen; featuring greater ease of reduction operations, production of high grade metal, and one that is more economically advantageous than that afforded in other reduction processes of such ores; by utilizing the advantage of deriving a hydrocarbon fuel from such heated mixtures and then burning it with the oxygen as driven off chemically from the ores.

The process begins with the stated mixing together of the starting materials within a suitable container, then heating the mixture within effective proximity of a suitable furnace arrangement to which sufficient heat may be applied.

Mixture is then heated until ignition of the produced fuel results and goes to completion, and is attended by such mechanical arrangement as necessary for collecting and venting of the combustion flue gases.

The temperature operational range throughout the burning (ignition) period is that which is necessary to maintain ignition until sufficient produced fuel is oxidized and the ores properly reduced, which is in the approximate range of from 650° through 1600°F.

With the reaction terminated sufficient time is allowed for cooling and then the container is emptied of the residue into another container suitable for adding water, hydrocarbon solutions, alcohol solutions, acids and the like. Residue is then boiled in water and then flushed with water, the waste chemicals and water being decanted. It is then further cleansed with such other agents as stated, finally re-flushing with water, drying carefully so as not to reoxidize the metal powder with atmospheric gases, and screened for usage.

The reduced, cleansed, and dried powder may then be utilized as is commercially, or smelted to refined powder, and ingot forms by conventional furnaces and mechanisms, and techniques known and standard for such Class III-B metal.

Thus, from the instant Class III-B metal ore reduction commercially pure (or semi-pure) grade powder and ingot are the resultant forms as herein stated and claimed, and with proper smelting and refinements of same. However, it is herein understood the smelting and refinements are not necessary requirements for instant reductions; that thus so reduced metal powders are commercially usable as is.

OPERATIONAL EXAMPLE 1. —FOR THORIUM METAL ORE REDUCTION

The operation for Thorium metal ore reduction as derived from the foregoing specification may be exemplified more particularly by an explanation for the reduction of a 20 ounce batch of Thorium ore ($ThO_2$), which the inventor has operated successfully. Examples of other batch sizes will not herein be given for Thorium ore because inventor has reduced various such batches and found the ingredient ratios for all such batches remain in the approximate same proportion as the given example.

The reduction equipment consists of; a vertical gas-fired furnace, being circular in shape and opening from the top with a removable cover, and with a motor powered blower; a silicon-carbide crucible also made circular in shape so as to fit within the furnace, and being approximately 12 inches tall and 6 inches wide; a stainless steel boiling vessel for cleansing, leaching, and boiling the residue powder material, and for drying it over a provided hot plate or burner; and a suitable stirring rod or instrument preferably of stainless steel or the equivalent.

Introduced within the crucible are the mixed ingredients consisting of; twenty ounces (approximately one cup) Thorium dioxide ($ThO_2$) of −400 or higher mesh grade; one cup (measuring) of sodium hydroxide (NaOH); one cup of sugar ($C_{12}H_{22}O_{11}$). Good mixing is necessary and emphasized so all ingredients are in reduction contact.

The crucible is then positioned within the furnace which is then fired and allowed to heat until the mixture begins to boil, at which time it ignites from the furnace flame. This is approximately 650°F. The furnace burner is allowed to heat the crucible for 2 or 3 minutes longer and then shut off. The mixture within the crucible continues to burn briskly. After about 5 minutes of such burning the furnace is again fired and allowed to again heat the crucible for about 5 minutes. This is repeated two or three times until mixture has burned completely, or the gases within the mixture. At the final furnace burn the residue and crucible are allowed to heat up to approximately 1600°F. This insures that the last of the created hydrocarbon gases and carbon unites with the last of the oxygen of the ore so as to form carbon monoxide (CO), and by so doing completely reducing the ore. In the meantime the sodium of the sodium hydroxide has formed a protective coating along with some of the carbon around the reduced Thorium metal granules and so prevents re-oxidization of the metal as those two elements continue to have high affinity for oxygen. Should the temperature be elevated too high re-oxidization would surely transpire of the Thorium metal in such atmospheric environment. For this reason the exact and same operation as described within this example may be accomplished within a vacuum-inert-outgassing atmospherically controlled crucible or reduction vessel so that such re-oxidization cannot transpire even up to and beyond the melting points of the Class III-B metals so reduced. Such a system is herein pointed out and specifically claimed within instant application. Further, it must be remembered that when such a controlled system is utilized the hydrocarbon gases formed at the boiling of the mixture are potentially explosive, and that the internally released oxygen (from the ores and other ingredients) will support the burning (explosion). Therefore, care must be exercised to insure that such an atmospherically controlled outgassing furnace system is always properly ignited before the heat (endothermic) from the furnace reaches the combustion (kindling) point; that without such proper ignition (prior to such kindling point that may be reached at red heat of the crucible) explosion and hazard may result.

When the reduction is finished the crucible is removed from the furnace and allowed to cool. Residue material is then removed and placed within the flushing vessel.

Water is then added and residue stirred and crushed so no lumps or chunks exist. The contents are then boiled for about fifteen or twenty minutes, with stirring, after which it is allowed to settle out and then liquid dross decanted, leaving the Class III-B powder. This may be repeated two or three times until powder is cleansed. Solvents such as alcohols are added and contents stirred good so as to dissolve carbon contaminant material into solution and is then decanted off after which material is again flushed with water until powder is sufficiently cleansed. During such cleansing the sodium compounds also go into solution and is decanted off. Optionally the powder may be put into a container sufficient to withstand the addition of hydrochloric acid (weak), with stirring, decanting, further flushing and boiling in water so that all the sodium and carbon compounds are brought into solution to be decanted off. Residue powder metal is then carefully dried within the flushing vessel over the hot plate or burner so that it will not re-oxidize with the component gases of the atmosphere, then screened to remove any foreign particles and the like.

Class III-B metal powder may then be utilized commercially as is or transported to such smelting operations as is known to exist for further smelting and refining into sizes, shapes and the like that is required by the operator. As reduced it may be in either the pure of semi-pure commercial configuration as controlled by the process operation and as the operator may so desire. Higher purity is attained by the usage of vacuum-inert-outgassing furnace systems for the reduction medium followed by flushing and cleansing sufficient to produce the desired purity. It must be remembered that the only elements within the reduction medium are the ores to be reduced, sodium, carbon, hydrogen and oxygen. Since the burning of the produced hydrocarbon fuel consumes the carbon, hydrogen and oxygen the only other contaminant would be the sodium in oxide form, which is easily removed by such solvents, acid, and water as above stated.

The ingredient ratios for instant example for Thorium metal are not necessarily confined to those as given (and all batch sizes). Example ratios represent a norm and the ingredients may vary lower or higher with respect to any other of the ingredients, as reduction effectiviness and requirements dictate (for purity, ease of operations, and the like). This is reflected in the definite weight of the ore being reduced (in this example twenty ounces), but volume (cup) measurements for the other ingredients. This set of batch ratio conditions also apply to all the Class III-B metal ores as so reduced by instant process.

CLASS III-B METALS ORE REDUCTION CHEMISTRY

With heating of such ores as given in example 1 (and all Class III-B metal ores) in the presence of some form of sugar or starch and a base hydroxide as formed from metals of the Classes I-A or II-A periodic groups hydrocarbon gases are formed comparable to Methane gas ($CH_4$), gasoline-like ($C_6H_{14}$), and others of the hydrocarbon compounds, possibly to the crude ($C_nH_{2n+2}$). The oxygen from the ores and other reduction components is released within such a system and unites with the fuel to support the combustion reactions (oxidation), and so until such materials are consumed out of the mixture, with the ores being thereby reduced to the metals.

What is claimed as new and desired to be secured by Letters Patent is:

1. A method of reducing Class III-B and Lanthanide and Actinide metal series ore oxides individually and in combinations to powder and alloy forms comprising the steps of: (A) Adding powdered Class III-B oxides to materials selected from the group consisting of sugar and starch and a base hydroxide, (B) mixing, and adding to a reduction container, (C) applying heat to the mixture until combustible materials burn, (D) adding water, boiling and flushing, (E) leaching with hydrochloric acid and hydrocarbon solvents, (F) again adding water, boiling and flushing, then (G) drying, and (H) smelting the remaining material to produce Class III-B metal powder and ingot.

2. The process of claim 1 wherein the sugar and starch are in the forms of Sucrose ($C_{12}H_{22}O_{11}$), Glucose ($C_6H_{12}O_6$), Fructose ($C_6H_{12}O_6$), and starch ($C_6H_{10}O_5$).

3. The process of claim 1 wherein the reduction container is subjected to standard atmospheric environment at reduction area.

4. The process of claim 1 wherein the reduction container is subjected to controlled vacuum-inert atmospheric environment at reduction area, and from which gases may exit.

5. The process of claim 1 wherein the burning is caused by the chemical union of hydrocarbon gases created within the process mixture and the oxygen from the process ore.

6. The process of claim 1 wherein the Class III-B oxides are individual and combined metals as derived from the ores Monazite, Carnotite, and Uranite or Pitchblende.

7. The process of claim 1 wherein the base hydroxide is sodium hydroxide and others as may be selected from the Classes I-A and II-A metals of the periodic table of elements.

* * * * *